United States Patent
Bai et al.

(10) Patent No.: US 12,545,829 B2
(45) Date of Patent: Feb. 10, 2026

(54) METHOD OF FABRICATING SURFACTANT FOR IMPROVING THE RECOVERY RATE OF OIL RESERVOIRS IN LOW-PERMEABILITY SANDSTONE

(71) Applicant: Changzhou University, Changzhou (CN)

(72) Inventors: Jiajia Bai, Changzhou (CN); Lei Tao, Changzhou (CN); Wenyang Shi, Changzhou (CN); Na Zhang, Changzhou (CN); Zhengxiao Xu, Changzhou (CN); Qingjie Zhu, Changzhou (CN); Yunpeng Ma, Changzhou (CN); Mingzhu Liu, Changzhou (CN); Shuanghu Si, Changzhou (CN); Zhu Ren, Changzhou (CN); Tianshuai Gu, Changzhou (CN); Haichi Shang, Changzhou (CN); Yahu Liu, Changzhou (CN); Yaxuan Zhang, Changzhou (CN); Yueyang Wang, Changzhou (CN)

(73) Assignee: Changzhou University, Changzhou (CN)

( * ) Notice: Subject to any disclaimer, the term of this patent is extended or adjusted under 35 U.S.C. 154(b) by 0 days.

(21) Appl. No.: 18/550,131

(22) PCT Filed: Apr. 13, 2023

(86) PCT No.: PCT/CN2023/088225
§ 371 (c)(1),
(2) Date: Feb. 11, 2025

(87) PCT Pub. No.: WO2024/001425
PCT Pub. Date: Jan. 4, 2024

(65) Prior Publication Data
US 2025/0361436 A1    Nov. 27, 2025

(30) Foreign Application Priority Data
Jun. 30, 2022 (CN) .......................... 202210779024.6

(51) Int. Cl.
C09K 8/584 (2006.01)
C09K 8/60 (2006.01)
C09K 8/86 (2006.01)

(52) U.S. Cl.
CPC .............. *C09K 8/584* (2013.01); *C09K 8/602* (2013.01); *C09K 8/86* (2013.01); *C09K 2208/12* (2013.01)

(58) Field of Classification Search
CPC ....................................................... C09K 8/60
See application file for complete search history.

(56) References Cited

U.S. PATENT DOCUMENTS 10,787,603 B2 * 9/2020 Haghighi ............... C09K 8/845
2007/0173414 A1 7/2007 Wilson, Jr.
(Continued)

FOREIGN PATENT DOCUMENTS

CN 102277149 B 12/2013
CN 104130798 A 11/2014
(Continued)

*Primary Examiner* — William D Hutton, Jr.
*Assistant Examiner* — Avi T Skaist
(74) *Attorney, Agent, or Firm* — IDEA Intellectual Limited; Sam T. Yip (57) ABSTRACT

The present invention provides a method of preparing a surfactant for improving the recovery rate of oil reservoirs in a low-permeability sandstone, including two steps of preparing a deep-eutectic solvent and preparing a surfactant. The surfactant of the present invention significantly reduces the interfacial tension between oil and water and has the effect of inhibiting the hydration expansion of clay minerals.

10 Claims, 3 Drawing Sheets

(56) References Cited

U.S. PATENT DOCUMENTS

2009/0247432 A1* 10/2009 Miller ..................... C09K 8/60
507/240
2012/0028855 A1    2/2012 Miller

FOREIGN PATENT DOCUMENTS

| CN | 105602541 A | 5/2016 |
|---|---|---|
| CN | 112266776 B | 5/2021 |
| CN | 109280021 B | 8/2021 |
| CN | 114293958 A | 4/2022 |
| CN | 114989800 A | 9/2022 |
| CN | 115058240 A | 9/2022 |
| CN | 115074101 A | 9/2022 |

* cited by examiner

METHOD OF FABRICATING SURFACTANT FOR IMPROVING THE RECOVERY RATE OF OIL RESERVOIRS IN LOW-PERMEABILITY SANDSTONE

FIELD OF THE INVENTION

The present invention generally relates to the technical field of petroleum development. More specifically the present invention relates to methods of fabricating a surfactant for improving the recovery rate of reservoirs in low-permeability sandstone.

BACKGROUND OF THE INVENTION

Oil is an important strategic energy source used for storage. China stands as the world's second-largest oil refiner and oil consumer. In 2019, China's dependence on foreign crude oil has reached 70%. Given the current complexities and fluctuations in international trade, this dependence poses a significant impact on China's energy supply pattern and presents new challenges to national energy security. Enhancing crude oil self-sufficiency in China becomes significantly important in driving national economic development and ensuring national energy security. Over the course of nearly 10 years, through technological research and management innovation, significant progress has been made in extracting oil and gas from low-permeability resources, contributing to a continuous growth in oil and gas yield and accounting for an increasing share of the overall output. In 2017, PetroChina's crude oil production from low-permeability reservoirs reached 36.8% of the total annual output. Waterflooding plays a crucial role in the production of low-permeability reservoirs, making the development of a surfactant with ultra-low interfacial tension, suitable for such reservoirs, essential to improve their recovery rate.

Low-permeability reservoirs exhibit four key geological characteristics: (1) high clay mineral content, resulting in water-sensitive damage; (2) poor reservoir physical properties; (3) small pore throats and a complex pore structure; and (4) complex wettability. These characteristics give rise to the following issues during water injection in low low-permeability reservoirs: (1) high water injection pressure, making conventional water flooding ineffective in replenishing formation energy; and (2) incompatibility between injected water and formation fluid, or fluid sensitivity damage caused by water-rock interaction, resulting in reduced permeability of the water phase in reservoirs.

Several research efforts have been conducted on the development of surfactants for oil displacement. US201711324673.2 discloses a surfactant and oil displacement agent for this purpose. The oil displacement agent enables the oil-water interface to reach 104 mN/m and achieves an emulsification and solubilization rate of over 80%. Meanwhile, US202011175796.6 discloses a compound system including a crude sodium acid, sodium benzenesulfonate and industrial sodium chloride for oil displacement. The surfactant increases the oil recovery rate by at least 25% compared to water flooding. Although these two methods are suitable for enhancing oil recovery in conventional reservoirs, they are not appropriate for low-permeability reservoirs, which require reservoir protection effects involving depressurization and enhanced injection. US201010205368.3 presents a non-ionic-anionic surfactant system that effectively addresses the issues such as high salinity of formation water, large heterogeneous oil-water flow ratio in reservoirs, high water content of crude oil, and viscosity. This system significantly reduces the interfacial tension between oil and water. However, the surfactant in this patent fails to reduce the injection pressure, and the cost of raw materials is relatively high.

SUMMARY OF THE INVENTION

The purpose of this section is to outline some aspects of embodiments of the present invention and briefly describe some preferred embodiments. Some simplifications or omissions may be made in this section, as well as in the abstract and titles of this application, to avoid obscuring the purpose of this section, abstract and titles, and such simplifications or omissions should not be used to limit the scope of the present invention.

In view of the problems mentioned above and/or in the prior art, the present invention is proposed.

Therefore, the purpose of the present invention is to overcome the deficiencies in the prior art and provide a method for fabricating a surfactant that improves the recovery rate of oil reservoirs in low-permeability sandstone.

In order to solve the above-mentioned technical problems, the present invention provides the following technical solution: a method of fabricating a surfactant for improving the recovery rate of oil reservoirs in low-permeability sandstone, including the following steps:

Preparation of deep-eutectic solvent: mixing and heating choline chloride and carboxylic acid together to obtain a deep-eutectic solvent;

Preparation of surfactant (DES): mixing the deep-eutectic solvent and CTAB with an appropriate amount of water to obtain a surfactant for flooding oil in low-permeability sandstone reservoirs.

As a preferred embodiment of the method for fabricating a surfactant for improving the recovery rate of oil reservoirs in low-permeability sandstone of the present invention, the carboxylic acid used in the preparation of the deep-eutectic solvent step includes one or more of oxalic acid, glycolic acid, malonic acid, lactic acid, pyruvic acid, succinic acid, glutaric acid, malic acid, citric acid, and 5-ketoglutaric acid.

As a preferred embodiment of the method for fabricating a surfactant for improving the recovery rate of oil reservoirs in low-permeability sandstone of the present invention, in the step of preparing the deep-eutectic solvent, the carboxylic acid is citric acid.

As a preferred embodiment of the method for fabricating a surfactant for improving the recovery rate of oil reservoirs in low-permeability sandstone of the present invention, in the step of preparing the deep-eutectic solvent, the mole ratio between choline chloride and carboxylic acid is 1~2:1~2.

As a preferred embodiment of the method for fabricating a surfactant for improving the recovery rate of oil reservoirs in low-permeability sandstone of the present invention, the heating process in the step of preparing the deep-eutectic solvent is heating to 75~120° C. for 0.5~2 h.

As a preferred embodiment of the method for fabricating a surfactant for improving the recovery rate of oil reservoirs in low-permeability sandstone of the present invention, in the step of preparing the surfactant, the deep-eutectic solvent is 0.5%~2% of the total weight of the surfactant.

As a preferred embodiment of the method for fabricating a surfactant for improving the recovery rate of oil reservoirs in low-permeability sandstone of the present invention, in the step of preparing the surfactant, the deep-eutectic solvent is 1% of the total weight of the surfactant.

As a preferred embodiment of the method for fabricating a surfactant for improving the recovery rate of oil reservoirs in low-permeability sandstone of the present invention, in the step of preparing the surfactant, the mole ratio between the deep-eutectic solvent and CTAB is 1~4:1~4.

As a preferred embodiment of the method for fabricating a surfactant for improving the recovery rate of oil reservoirs in low-permeability sandstone of the present invention, in the step of preparing the surfactant, the mole ratio between the deep-eutectic solvent and CTAB is 3:2.

As a preferred embodiment of the method for fabricating a surfactant for improving the recovery rate of oil reservoirs in low-permeability sandstone of the present invention, combining the steps of preparing the deep-eutectic solvent and the step of preparing the surfactant, the method is to directly add choline chloride, carboxylic acid and CTAB into an aqueous solution to compound the surfactant.

Beneficial effects of the present invention:
(1) The surfactant reduces the oil-water interfacial tension to below $10^{-3}$ mN/m, which is extremely low and significantly enhances oil washing efficiency;
(2) The deep-eutectic solvent's strong polarity of N—H and H—O bonds enables it to attach to the surface of clay minerals and inhibit the hydration expansion of clay minerals, thus preventing water-sensitive damage to the reservoir during water flooding;
(3) The surfactant exhibits temperature and salt resistance; and
(4) The surfactant's raw materials are cost-effective, widely available, non-toxic, environmentally friendly, non-volatile at room temperature, and easy to store.

BRIEF DESCRIPTION OF THE DRAWINGS

In order to more clearly illustrate the technical solutions of the embodiments of the present invention, the following will briefly introduce the accompanying drawings that is required to better describe the embodiments. Obviously, the following description of the drawings only relates to some embodiments of the present invention. For a skilled person in the art can obtain other drawings based on these drawings without any creative effort, in which.

DETAILED DESCRIPTION

To further illustrate and clarify the objects, features and advantages of the present invention, specific details are provided in the following detailed description, based on the embodiments disclosed in the specification.

It should be noted that while a significant amount of specific details are presented to facilitate a comprehensive understanding of the present invention, the invention can also be implemented in various other ways that differ from those described herein. A skilled person in the art can achieve these variations without departing from the scope of the present invention. Therefore, the present invention is not limited to the specific examples disclosed below.

Additionally, the term "one embodiment" or "an embodiment" used herein refer to a specific feature, structure or characteristic that may be included in at least one embodiment of the present invention. The phrase "in one embodiment" appearing in different sections of this specification does not necessarily refer to the same embodiment and does not imply that these embodiments are separate or mutually exclusive from other embodiments.

Example 1

(1) Using a high-precision balance to compound 0.6 g ($2.9 \times 10^{-3}$ mol) of citric acid and 0.4 g ($2.9 \times 10^{-3}$ mol) of choline chloride with a mole ratio of 1:1 in a beaker with 100 g of water, and stirring them at 80° C. for 2 hours for mixing evenly to obtain a deep-eutectic solution for further action.

(2) Adding 1 g ($2.7 \times 10^{-3}$ mol+) of CTAB crystal in a beaker with 100 mL of distilled water and stirring them evenly for further action.

(3) Using a spinning drop interfacial tensiometer, JJ2000B2 from Shanghai Zhongchen Digital Technology Equipment, to evaluate the interfacial tensions between the deep-eutectic solvent and crude oil and between CTAB and crude oil, respectively. The test speed is 5000 r/min, the test temperature is 40° C., and each test point is stable for 16 minutes. The interfacial tension between crude oil and distilled water is 2.13 mN/m.

(4) Compounding 0.592 g ($1.68 \times 10^{-3}$ mol) of the deep-eutectic solvent and CTAB with various mole ratio of 2:8, 4:6, 5:5, 6:4 and 8:2, respectively, with 100 mL of distilled water, and then stirring them evenly for further action.

(5) Using a spinning drop interfacial tensiometer, JJ2000B2 from Shanghai Zhongchen Digital Technology Equipment, to evaluate the interfacial tensions between the compound system obtained from step (4) and crude oil. The test speed is 5000 r/min, the test temperature is 40° C., and the interfacial tension test time is stable for 16 minutes.

Explanation: The crude oil mentioned in step (3) and step (5) is the crude oil obtained from a certain formation of Shengli Oilfield. The obtained data are recorded in Table 1.

TABLE 1

Oil-water interfacial tension under different proportions of deep eutectic solvent and CTAB

| Compound system | Ratios between the deep-eutectic solvent and CTAB | | | | | | |
|---|---|---|---|---|---|---|---|
| | 1:0 | 2:8 | 4:6 | 5:5 | 6:4 | 8:2 | 0:1 |
| interfacial tension (mN·m$^{-1}$) | $9.9 \times 10^{-2}$ | $1.8 \times 10^{-2}$ | $1.8 \times 10^{-2}$ | $2.6 \times 10^{-3}$ | $1.3 \times 10^{-3}$ | $1.7 \times 10^{-2}$ | $8.7 \times 10^{-2}$ |

It can be seen from Table 1 that neither the deep-eutectic solvent nor CTAB possesses the ability to form an ultra-low interface. However, when the ratio of deep-eutectic solvent and CTAB reaches 5:5 and 6:4, it can form an ultra-low interfacial tension with a scale of $10^{-3}$ mN/m.

Example 2

Figure 1:
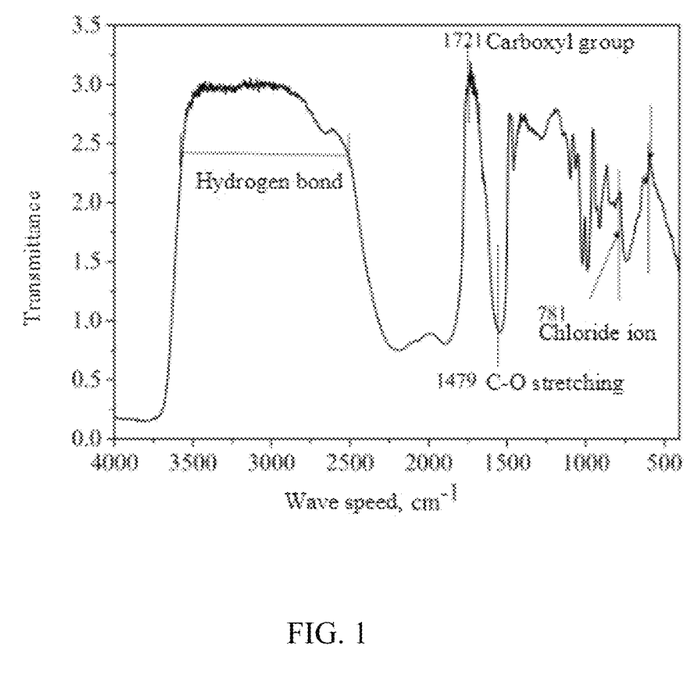
FIG. 1 depicts an infrared spectral transmittance chart of a deep-eutectic solution in the embodiment 1 of the present invention, in which the mole ratio between choline chloride and citric acid is 1:1.

Infrared spectrum analysis is conducted to evaluate the deep-eutectic solvent prepared by mixing choline chloride and citric acid as described in Example 1 using a Thermo Scientific Nicolet iS5 FT-IR spectrometer, and the infrared transmittance spectrum of the deep-eutectic solvent is obtained (FIG. 1).

As shown in FIG. 1, there are obvious hydrogen bond bands shown in the wave velocity range of 2500-3500 cm$^{-1}$. Additionally, the vibration peak of the carboxyl group at the wave number 1721 cm$^{-1}$ indicates that the carboxyl group of citric acid has been retained. The hydrogen bond of the deep-eutectic solvent is a polar bond, which interacts with the hexadecyl hydrophobic chain of CTAB to effectively reduce the oil-water interface. Furthermore, the hydrogen bond and carboxyl group can effectively attach to the surface of clay minerals or enter into clay mineral layers, inhibiting the hydration expansion of clay and protecting reservoirs.

Example 3

(1) Using a high-precision balance to compound 0.6 g ($2.9 \times 10^{-3}$ mol) of citric acid and 0.4 g ($2.9 \times 10^{-3}$ mol) of choline chloride with a mole ratio of 1:1 in a beaker with 100 g of water, and stirring them at 80° C. for 2 hours for mixing evenly to obtain a deep-eutectic solution for further action.

(2) Compounding 1 g of the deep-eutectic solution and CTAB in a mole ratio of 6:4 with 100 mL of distilled water, and stirring them evenly for further action.

(3) Repeating the above steps (1) and (2) to parallelly obtain 6 compound systems. Then, respectively adding 0.028 g, 0.140 g, 0.420 g, 0.700 g, and 1.12 g of $CaCl_2$) powder to each system, so that the $Ca^{2+}$ concentrations in each system are 100 mg/L, 500 mg/L, 1000 mg/L, 1500 mg/L, 2500 mg/L, and 4000 mg/L, respectively.

(4) Using a spinning drop interfacial tensiometer, JJ2000B2 from Shanghai Zhongchen Digital Technology Equipment, to evaluate the oil-water interfacial tensions of the compound systems in different mineralization degree. The crude oil used herein is a crude oil obtained from a certain formation of Shengli Oilfield. The test speed is 5000 r/min, the test temperature is 40° C., and the interfacial tension test time is stable for 16 minutes.

The evaluated interfacial tensions of the compound systems in different $Ca^{2+}$ concentrations are recorded and presented in Table 2.

TABLE 2

Salt tolerance test of the compound system of deep-eutectic solvent and CTAB in the ratio of 6:4

| Compound system | $Ca^{2+}$ concentration (mg/L) | | | | | |
|---|---|---|---|---|---|---|
| | 100 | 500 | 1000 | 1500 | 2500 | 4000 |
| interfacial tension (mN·m$^{-1}$) | $3.7 \times 10^{-3}$ | $6.2 \times 10^{-3}$ | $7.1 \times 10^{-3}$ | $2.0 \times 10^{-2}$ | $3.3 \times 10^{-3}$ | $4.1 \times 10^{-3}$ |

As shown in Table 2, when the $Ca^{2+}$ concentration reaches to 1000 mg/L, the oil-water interfacial tension remains at the scale of $10^{-3}$ mN/m, indicating that the compound system has excellent salt tolerance.

Example 4

Evaluating the inhibitory effect on clay minerals by cation exchange capacity (CEC)

The surface of clay minerals in sandstone is generally negatively charged, and cations are absorbed to the surface of clay minerals for maintaining electrical balance. The main types of clay mineral are montmorillonite, illite and interstratified montmorillonite/illite. When clay minerals come into contact with water, the absorbed cations on the surface are exchanged with the cations in the solution, a process known as cation adsorption and exchange. The maximum amount of cations that can be exchanged is called cation exchange capacity (CEC). The hydration of cations in clay mineral layers is the main factor causing the expansion of clay mineral crystal layers. The larger the CEC value, the stronger the hydration expansion.

Specific Experimental Steps:

(1) Preparation of a surfactant: Choline chloride and citric acid are mixed at a mole ratio of 1:1 and heated at 80° C. for 0.5 h to obtain a deep-eutectic solvent. 2 g of the deep-eutectic solvent is added to 200 ml of distilled water to prepare a deep-eutectic solvent aqueous solution with a mass fraction of 1%, CTAB crystals are then added in a mole ratio of 6:4. The mixture is stirred thoroughly until no sediment is observed.

(2) Preparation of an appropriate amount of surfactant-treated sodium montmorillonite. The method for treating the sodium montmorillonite with the surfactant is as follows: first, dry the sodium montmorillonite at 150° C. until a constant weight is achieved. Next, prepare the surfactant and add a certain amount of the dried sodium montmorillonite to the inhibitor solution. Stir the mixture for 24 hours. Afterwards, the suspension is removed and introduced into a centrifuge tube, where it is centrifuged at a speed of 5000 rpm for 10 min. The supernatant is then removed, leaving behind a precipitate that will be dried at 80° C.

(3) The CEC of sodium montmorillonite and sodium montmorillonite treated with surfactants is tested in accordance with the Petroleum and Natural Gas Industrial Standard of the People's Republic of China-Determination of Clay Cation Exchange Capacity and Base Component (SY/T 5395-2016). The specific test steps are as follows:

①. Dry the 100-mesh sodium montmorillonite and the 100-mesh sodium montmorillonite treated with a surfactant for 4 hours at 105±1° C. in an air blast constant temperature drying oven.

②. Add 100 g of dry sodium montmorillonite and surfactant-treated sodium montmorillonite, respectively, to distilled water until reaching a total volume of 200 mL. Mix them well and stir them in a high-speed mixer for 15 minutes.

③. Inject 2 mL of sodium montmorillonite slurry and 2 mL of surfactant-treated sodium montmorillonite slurry into a 150 mL beaker using a needleless syringe, respectively (if the consumed volume of methylene blue solution exceeds 12 mL, reduce the volume of the tested sample to 1.0 mL). Add 20 mL of distilled water into the beaker, and then add 15 mL of 3% hydrogen peroxide and 0.5 mL of dilute sulfuric acid in order to eliminate the interference of impurities. Slowly boil the mixture for 10 mins (do not evaporate to dryness), and then cool and dilute it to around 50 mL using distilled water.

④. Titrate with methylene blue standard solution. Initially, add 1 mL of methylene blue solution drop by drop while stirring for about 30 seconds. When the solid is in a suspended state, transfer a drop of the solution on filter paper using a gloss rod and observe if a blue circle appears around the stained clay spot. If there is no such color circle, continue adding 1 mL of methylene blue solution and repeat the above process until a blue circle appears. Once the circle appears, stir the solution for 2 minutes and transfer 1 drop onto filter paper. If the color circle remains visible, the titration is complete. If the color circle disappears after stirring for 2 minutes, add 0.5 mL of methylene blue solution dropwise and repeat the above process until the blue circle around the spot remains visible after stirring for 2 minutes. Record the number of milliliters of methylene blue standard solution consumed.

⑤. Calculate the cation exchange capacity of sandstone according to the following formula:

$$CEC = \frac{\text{mililiters of consumed methylene blue solution}}{\text{Grams of dry sample for titration}} * 10 \text{ mmol/100 g}$$

The calculated values are stated in Table 3.

TABLE 3

CEC test results are as follows:

| Type of solution | Dried sodium montmorillonite | Dried sodium montmorillonite treated with surfactant |
|---|---|---|
| CEC test results, mmol/100 g | 90 | 40 |

As shown in Table 3, the cation exchange capacity of the dried sodium montmorillonite is 90 mmol/100 g, while the cation exchange capacity of sodium montmorillonite treated with surfactant is 40 mmol/100 g, showing that the surfactant possesses a good inhibitory effect on clay mineral expansion.

Example 5

Press 10 g of 200-mesh sodium montmorillonite at 10 MPa in a YLJ600 press machine for 1 min for making three artificial rock core samples. Add the pressed artificial rock core in plates with distilled water, 3% wt KCl solution and the inhibitor system of deep-eutectic solvent and CTAB (add 2 g of deep-eutectic solvent in 200 ml of distilled water for making a deep-eutectic solvent aqueous solution with a mass fraction of 1%, and then add CTAB crystals at a mole ratio of 6:4 to CTAB), respectively. The amount of added solution just submerges the end face of the core. During the immersing process, pictures are taken and observed for recording the hydration processes of sodium montmorillonite in three different solutions. The images are shown in FIG. 2.

Figure 2:
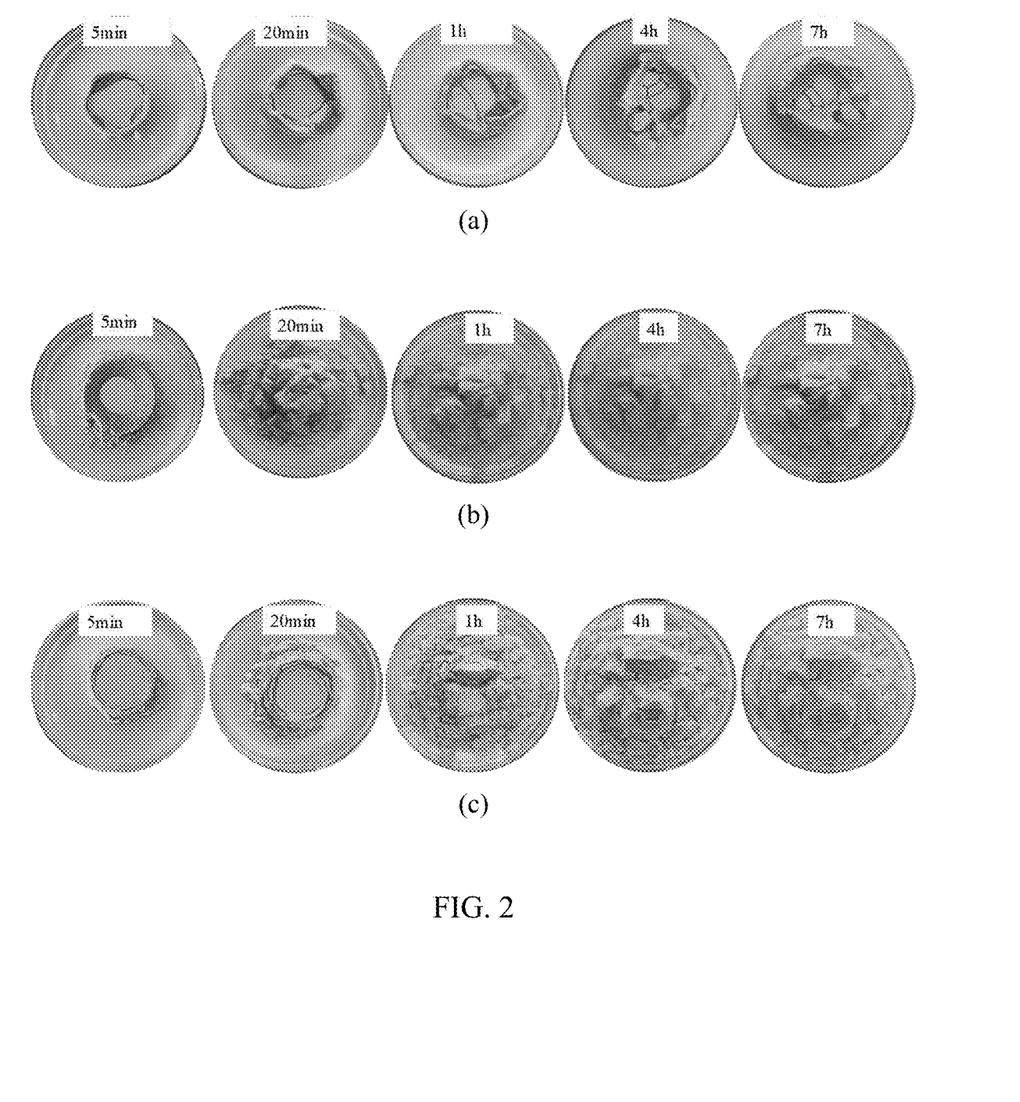
FIG. 2 shows images of sodium bentonite soaked in different solution for varying time in one embodiment of the present invention, in which (a) represents soaking in distilled water, (b) is soaking in 3% KCl solution, and (c) represents soaking in the inhibitor system compounded by the deep-eutectic solvent and CTAB.

As shown in FIG. 2, the volume of sodium bentonite immersed in distilled water quickly increases due to hydration swelling. When immersed in 3% KCl solution, the volume of sodium bentonite does not increase significantly, but it shows indications of dispersion. On the other hand, the volume of bentonite does not increase significantly after immersion in the inhibitor system of the deep-eutectic solvent and CTAB, and the bentonite is flocculent and dispersed, but the degree of dispersion is significantly lower than that of 3% KCl solution. This indicates that the inhibitor system of the deep-eutectic solvent and CTAB is more effective than the 3% KCl solution in inhibiting clay hydration swelling.

Example 6

The experimental samples are obtained from low-permeability sandstone reservoirs of Shengli Oilfield. The experimental steps are as follows:

(1) The natural rock core of the reservoir is subjected to cleansing, drying, saturated stimulation of formation water, and measurements of length, diameter, porosity and initial permeability;

(2) The rock core is saturated with crude oil from the reservoir and placed at the formation temperature for 24 hours;

(3) The simulated injection water is used to displace the core at a displacement flow rate of 0.05 mL·min$^{-1}$, and the pressure changes during the displacement process are recorded until the displacement pressure remains constant, which is then noted as the first water injection pressure;

(4) Inject the compounded surfactant solution under the same conditions, with a displacement flow rate of 0.05 mL min$^{-1}$, and record the injection pressure of surfactant after the injection pressure becomes stable.

(5) Continue to inject the simulated water into the rock core for the second injection at a displacement flow rate of 0.05 mL·min$^{-1}$, and record the injection pressure of the second water injection after the injection pressure becomes stable.

(6) The amounts of displaced oil and water during the experiments are recorded to calculate the final enhanced recovery rate.

During the experiment, the injected fluid is formation crude oil from the low-permeability reservoir of Shengli Oilfield. The preparation method of the surfactant includes manufacturing a deep-eutectic solvent by compounding choline chloride and citric acid in a mole ratio of 1:1. This solvent is then mixed with CTAB crystals at a mole ratio of 6:4 to CTAB to create a deep-eutectic solvent aqueous solution with a mass fraction of 1%, which is stirred for homogeneity. Calculate the depressurization rate during the first and second water injections by formula 1:

Depressurization rate=(the first water injection pressure−the second first water injection pressure)/the first water injection pressure×100   (1).

Five samples are evaluated, and the depressurization rate and final recovery rate are recorded in Table 4.

TABLE 4

Table of depressurization rate and final recovery rate of 5 samples

| Core No. | Porosity, % | Permeability, mD | Injected pressure, MPa | | | Depressurization rate/% | Final recovery rate, % |
|---|---|---|---|---|---|---|---|
| | | | The first water injection | Surfactant solvent injection | The second water injection | | |
| D-1 | 6.50 | 0.172 | 11.21 | 5.60 | 5.51 | 50.85 | 38.4 |
| D-2 | 6.82 | 0.236 | 2.50 | 1.72 | 1.68 | 32.80 | 37.5 |
| D-3 | 5.61 | 0.125 | 6.50 | 2.01 | 1.98 | 69.54 | 40.2 |
| D-4 | 6.40 | 0.105 | 5.67 | 3.50 | 3.42 | 39.68 | 36.8 |
| D-5 | 7.10 | 0.201 | 7.85 | 4.50 | 4.23 | 46.11 | 39.1 |

As shown in Table 4, the water injection pressure is significantly decreased during the second water injection, and the depressurization rate of these five samples ranges from 32.80% to 69.54%, with an average of 47.80%; the final recovery rate across these five samples falls within the range of 37.5% to 40.2%, with an average of 38.4%.

Example 7

Using a high-precision balance, measure 2.9×10−3 moles of oxalic acid, glycolic acid, malonic acid, lactic acid, pyruvic acid, succinic acid, glutaric acid, malic acid, citric acid, and 5-ketoglutaric acid, respectively. These acids are then individually added with 0.4 g (2.9×10$^{-3}$ mol) of choline chloride at a mole ratio of 1:1 in a beaker. Subsequently, the mixture is heated at 80° C. for 2 hours while being continuously stirred with a glass rod. In parallel, the deep-eutectic solvent is blended with distilled water, generating a deep-eutectic solution with a mass fraction of 1%.

(2) Introduce CTAB crystal into the deep-eutectic solvent with a mole ratio of 1:1 to create a solution.

(3) Take 50 mL of the solution and thoroughly stir it using a glass rod. Allow the solution to stand for 24 hours and observe whether any precipitation occurs.

Figure 3:
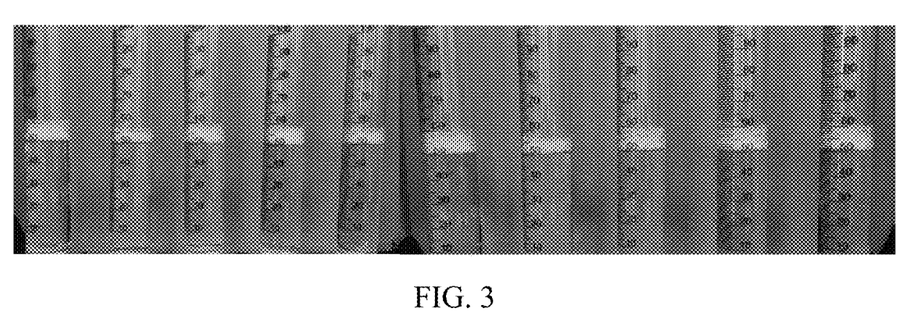
FIG. 3 display images of the mixture of DES and CTAB in a mole ratio of 1:1 with the addition of various acids immediately after stirring, in which the test tubes represent different acids, arranged from left to right as follows: oxalic acid, glycolic acid, propane acid, lactic acid, pyruvic acid, succinic acid, glutaric acid, malic acid, citric acid, and 5-ketoglutaric acid.
Figure 4:
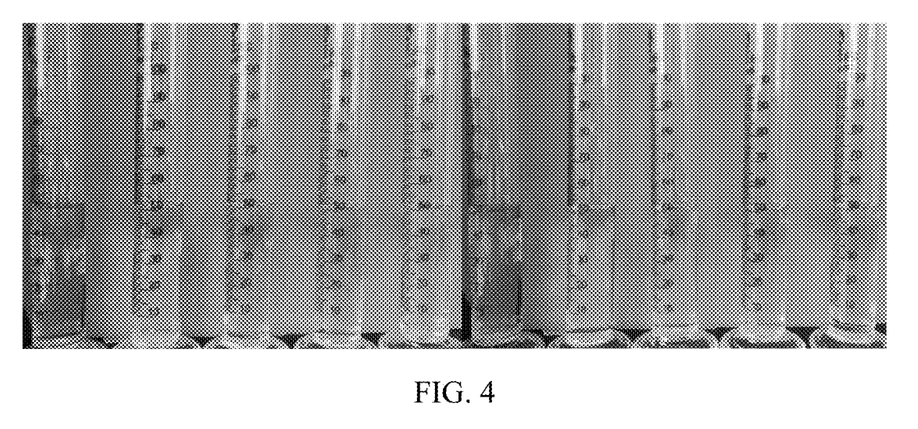
FIG. 4 display images of the mixture of DES and CTAB in a mole ratio of 1:1 with the addition of various acids after stirring and standing for 24 hours, in which the test tubes represent different acids, arranged from left to right as follows: oxalic acid, glycolic acid, propane acid, lactic acid, pyruvic acid, succinic acid, glutaric acid, malic acid, citric acid, and 5-ketoglutaric acid.

FIG. 3 depicts an image captured immediately after stirring, while FIG. 4 illustrates an image taken after a 24-hour period of static standing.

As illustrated in FIG. 3, bubbles are observed in the upper layer of the solution, and the solution is uniform without any precipitation. As shown in FIG. 4, the bubbles in the upper layer of the solution have disappeared, and the solution remain uniformly mixed with no signs of precipitation. The observations in both FIG. 3 and FIG. 4 affirm that oxalic acid, glycolic acid, malonic acid, lactic acid, pyruvic acid, succinic acid, glutaric acid, malic acid, citric acid and 5-oxoglutaric acid are all suitable materials for solution preparation.

It is important to note that the aforementioned embodiments are intended solely for illustrating the technical solutions of the present invention and not for restricting its scope. Although the present invention has been comprehensively elucidated with reference to the preferred embodiments, a skilled person in the art should realize that the technical solutions of the present invention can be modified or substituted with equivalent alternatives without deviating from the spirit and scope of the technical solution of the present invention, meaning that such modifications or substitutions, within the purview of the present invention, are comprehensively encompassed by the claims presented herein.

The invention claimed is:

1. A method for fabricating a surfactant for improving a recovery rate of oil reservoirs in low-permeability sandstone, comprising the following steps:
   mixing and heating choline chloride and a carboxylic acid together to obtain a deep-eutectic solvent; and
   mixing the deep-eutectic solvent and cetyltrimethylammonium bromide (CTAB) with an amount of water to obtain the surfactant for flooding oil in low-permeability sandstone reservoirs.

2. The method for fabricating a surfactant for improving the recovery rate of oil reservoirs in low-permeability sandstone of claim 1, wherein the carboxylic acid used in obtaining the deep-eutectic solvent comprises one or more of oxalic acid, glycolic acid, malonic acid, lactic acid, pyruvic acid, succinic acid, glutaric acid, malic acid, citric acid, and 5-ketoglutaric acid.

3. The method for fabricating a surfactant for improving the recovery rate of oil reservoirs in low-permeability sandstone of claim 2, wherein the carboxylic acid used in obtaining the deep-eutectic solvent is citric acid.

4. The method for fabricating a surfactant for improving the recovery rate of oil reservoirs in low-permeability sandstone of claim 1, wherein the mole ratio between the choline chloride and the carboxylic acid in obtaining the deep-eutectic solvent is 1-2:1-2.

5. The method for fabricating a surfactant for improving the recovery rate of oil reservoirs in low-permeability sandstone of claim 1, wherein the heating process in obtaining the deep-eutectic solvent is heating to 75-120° C. for 0.5-2 hours.

6. The method for fabricating a surfactant for improving the recovery rate of oil reservoirs in low-permeability sandstone of claim 1, wherein the deep-eutectic solvent used in obtaining the surfactant is 0.5%-2% of the total weight of the surfactant.

7. The method for fabricating a surfactant for improving the recovery rate of oil reservoirs in low-permeability sandstone of claim 1, wherein the deep-eutectic solvent used in obtaining the surfactant is 1% of the total weight of the surfactant.

8. The method for fabricating a surfactant for improving the recovery rate of oil reservoirs in low-permeability sandstone of claim 1, wherein the mole ratio between the deep-eutectic solvent and CTAB in obtaining the surfactant is 1-4:1-4.

9. The method for fabricating a surfactant for improving the recovery rate of oil reservoirs in low-permeability sandstone of claim 1, wherein the mole ratio between the deep-eutectic solvent and CTAB in obtaining the surfactant is 3:2.

10. The method for fabricating a surfactant for improving the recovery rate of oil reservoirs in low-permeability sandstone of claim 1, wherein combining the steps of obtaining the deep-eutectic solvent and the step of obtaining the surfactant, so that the choline chloride, the carboxylic acid and the CTAB are directly added into an aqueous solution to compound the surfactant.

\* \* \* \* \*